UNITED STATES PATENT OFFICE.

RICHARD S. WARING, OF PITTSBURG, PA., AND J. BURROWS HYDE, OF NEW YORK, N. Y.; SAID HYDE ASSIGNOR TO SAID WARING.

INSULATING MATERIAL FOR ELECTRICAL USES.

SPECIFICATION forming part of Reissued Letters Patent No. 10,350, dated July 3, 1883.

Original No. 267,045, dated November 7, 1882. Application for reissue filed June 2, 1883.

*To all whom it may concern:*

Be it known that we, RICHARD S. WARING, a citizen of the United States, residing at Pittsburg, Allegheny county, State of Pennsylvania, and J. BURROWS HYDE, a citizen of the United States, and residing in the city, county, and State of New York, have invented certain new and useful Improvements in Insulating Material for Electric Uses, of which the following is a specification.

Our invention relates to a composition of matter for the insulation of telegraph-wires; and it consists of a product or residuum of petroleum prepared as hereinafter specified.

In the distillation of mineral oils—such as petroleum-oils—a great number of distinct and separate products are produced. The naphtha, illuminating-oils, paraffine, &c., are evolved or sent over at varying degrees of temperature, leaving a tarry waxy residuum in the still. This residuum is capable of still further reduction, and when so treated various products are "sent over" or produced, such as are known in the market as "black oil," "wax-tailings," "green oil," &c.

In carrying out our invention we take the "residuum of petroleum," as known in the market, and subject it to a distilling or to an evaporating process, either of which is well known, so as to drive off all of the light volatilizable oils and the paraffine. The process of distillation or vaporization is carried on still further until products are obtained having the proper degree of consistence, which may be determined by the degree of heat to which the material is subjected, or by withdrawing a small portion from the still and allowing it to cool. The products which have been sent over in redistillation are black oil, which is a viscid mass; wax-tailings, which is of a yellowish-brown color and of a soft waxy consistency, termed by us "ambertine," and green oil, which we term "olivine," leaving in the still a fourth product or residuum, which is jet black and somewhat resinous in appearance, closely resembling obsidian or black volcanic glass, and from its conchoidal fracture, vitreous luster, and general appearance we are induced, for convenience, to term it "obsidine." Of these products just enumerated two or more of them are now brought together or used in succession. For example, we may employ the obsidine, tempered with a softer material to give flexibility, as a first coat to the wire to be insulated, with a second coat of ambertine to obtain a better non-adhesive surface; but for general purposes of insulation we prefer to mix the obsidine and ambertine together, with or without the olivine. These products, either combined or singly, as above stated, are reduced to a liquid state by heat, and the wire, which has been previously covered with cotton, as is usual, is immersed in the heated liquid compound until the cotton has become completely saturated, the hygroscopic water or other moisture expelled therefrom, and the interstices of the cotton filled with the insulating material. A wire thus coated will be found to be flexible to such a degree that it can be wound on a reel and bent in any desired manner without fracture of the coating thereon, and it will, besides, be water-repellent.

When desired to give greater body to the insulating material, or where a heavier coating is desired on the wires, we may add to the liquid product earth, clay, pulp, or other solid proper substance which will not change the chemical qualities of the insulating material; but we make no claim herein to an insulating compound thickened with such earthy matter, as the same is the sole invention of one of us—namely, Richard S. Waring—and is included in the subject-matter of another application for patent by said Waring.

If the heavier product—obsidine—is to be used alone, it may be tempered or reduced either with ambertine, as above described, or by combining it with hot linseed-oil or other like reducing agent.

We are aware that a product has been obtained by the distillation of residuum of petroleum which resembles in its looks and properties natural asphaltum, and that this product has been used for roofing and paving material and also for varnish. Such material for such uses we do not claim.

Having described our invention, what we claim is—

1. An insulating compound for telegraph-wires and electric uses, composed of two or more of the heavier products arising from the redistillation of the residuum of petroleum, substantially as set forth.

2. An insulating compound for electric uses, consisting of obsidine tempered with a softer reducing agent to give flexibility, substantially as set forth.

3. An insulating material for electric uses, consisting of one or more of the heavier products derived from petroleum residuum by redistillation, freed from paraffine and solid when cold, substantially as described.

In testimony whereof we have hereunto set our hands.

RICHARD S. WARING.
J. BURROWS HYDE.

Witnesses:
F. O. McCLEARY,
EDWARD E. ELLIS.